April 3, 1962 L. GOLAND ET AL 3,027,948
STABILIZATION OF ROTARY WING AIRCRAFT
Filed Jan. 24, 1958 3 Sheets-Sheet 3

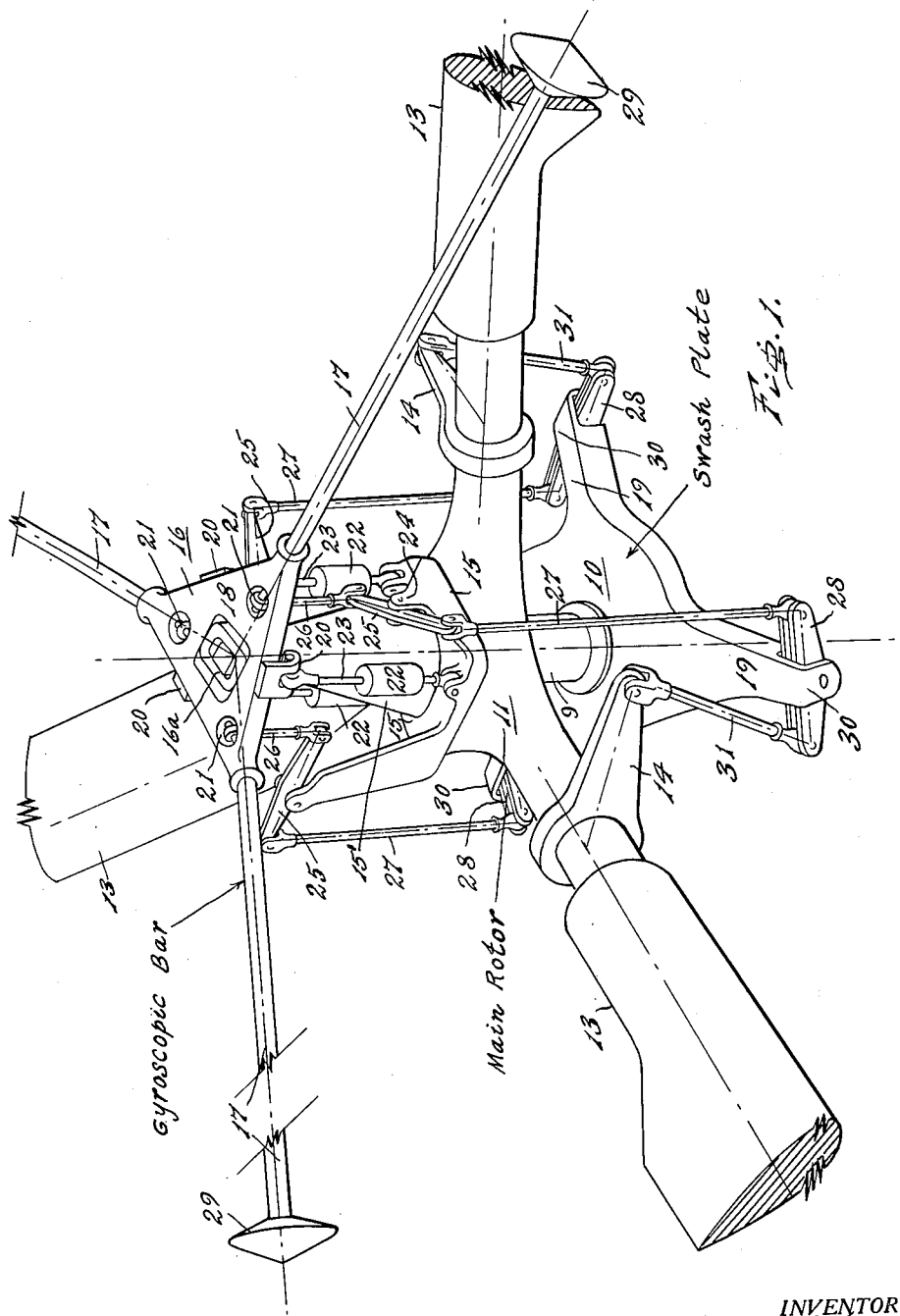

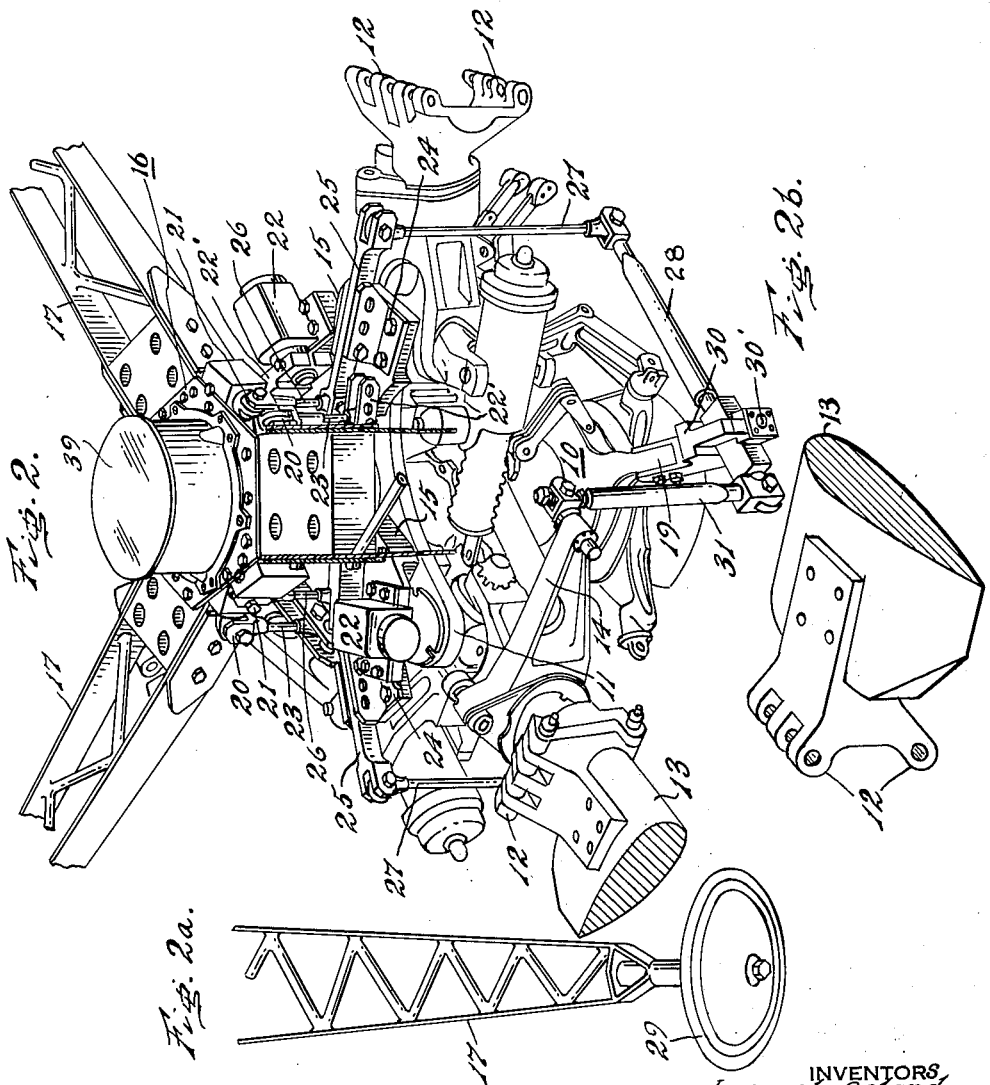

INVENTORS.
Leonard Goland
David F. Gebhard
BY Robert R. Kenworthy

Frank H. Borden
ATTORNEY

United States Patent Office 3,027,948
Patented Apr. 3, 1962

3,027,948
STABILIZATION OF ROTARY WING AIRCRAFT
Leonard Goland, Meadowbrook, David F. Gebhard, Richboro, and Robert R. Kenworthy, Philadelphia, Pa., assignors to Kellett Aircraft Corporation, Willow Grove, Pa., a corporation of Pennsylvania
Filed Jan. 24, 1958, Ser. No. 711,029
9 Claims. (Cl. 170—160.13)

This invention relates to the stabilization of rotary wing aircraft including helicopters, convertiplanes, and autogiros.

It is generally recognized that the operational utility of rotary wing aircraft is significantly limited by unsatisfactory stability and control characteristics. It is also recognized that all single rotor rotary wing aircraft are inherently unstable per se. This is especially so of small light weight helicopters that suffer from high rates of control response and short periods of oscillation but is also true to a lesser degree for all single rotor rotary wing aircraft. So far as known, no rotary wing aircraft has been developed prior to this invention which, with added stabilizing devices or systems, is so inherently stable throughout all of its flight regimes that, if desired, the aircraft can be flown on instruments without overriding pilot's control during at least some of its flight regimes.

A certain degree of stability and control has been effected by various types of stabilizers in rotary wing aircraft, but as previously developed the particular stabilizer has been tailored for optimum performance at one given flight regime, necessitating comprise for other flight regimes. Gyroscopic stabilizing bars, for instance, have had excellent stabilizing and control characteristics when designed for optimum performance in the hovering regime but the stability falls off on a gradient as the aircraft enters and pursues the cruising regime. Illustratively, for instance, the Kellett Aircraft Corporation, assignee of this application, has conducted research and development on this problem over a number of years, during which it developed and successfully flight-tested the KH-15 Variable Stability Helicopter, out of which development there arose patent application Serial No. 466,406, filed November 2, 1954, by Sissingh and Kenworthy, now eventuated into Patent No. 2,827,968 on March 25, 1958. This gyro device was excellent, but was primarily for the hovering regime. It is worthy of note that while the gyro can be tailored to other flight regimes, the stability always falls off on a gradient as the aircraft leaves the given flight regime.

Some efforts have been made to utilize tail control surfaces for stabilizing functions, but while these have some effects in cruising, they are inert so far as stabilizing the aircraft during hovering. What is essential is a stabilizing system for rotary wing aircraft that will insure good handling qualities in all flight regimes because this not only makes pilot control easy and simple, but also conduces toward instrument flight of the aircraft under all conditions. Such good handling qualities by inherent or imposed stability are useful under all conditions but are particularly critical and important in cruising and high speed flight when the C.G. is aft of the axis of the rotor, as the instability and the hazard associated therewith increases with increased speed.

The technical foundation for the stability and control difficulties of single rotor rotary wing aircraft lies in part at least in the fact that in general the longitudinal and lateral motions are uncoupled. For the conventional helicopter the blade tip path motion relative to the axis of no-feathering or the control axis is small compared to the amplitude of fuselage motion. The instability of rotary wing aircraft increases with cruising speed because the moment instability with angle of attack produced by the rotor is greatly increased with speed. That is, the stability characteristics in cruising flight, which vary from a rapid divergent oscillation to essentially a pure divergence, are functional with cruising speed. The period and damping of subsequent oscillations are of primary importance, and the rapidly divergent oscillation of the helicopter seems a major factor in its poor handling qualities.

In essence, what is essential in rotary wing aircraft, outside of hovering flight, is that the aircraft should be able to perform all of the normal maneuvers of which an average low speed airplane is capable. It is recognized that there are essential differences between rotary wing and fixed wing aircraft, the primary one being that in rotary wing aircraft the control is accomplished through inclination of the primary lift vector relative to the fuselage, while control of the airplane is accomplished by inclination of the entire aircraft. However, it would be desirable if the stability and control qualities of rotary wing aircraft could be equally functionally effective, as are those of fixed wing aircraft. This is accomplished by the instant invention.

It is among the objects of this invention: to provide a rotary wing aircraft with an integrated stabilizing system by which optimum stability can be effected throughout all of its flight regimes; to provide a stabilizing system as an independent unit or units for attachment to an existent helicopter to stabilize same; to provide a gyro stabilizing bar which is mounted on and above the helicopter rotor; to combine in a helicopter stabilizing components respectively operative at or near hovering and at cruising speeds so that the entire range of flight regimes is substantially equally stabilized and controlled; to improve gyroscopic stabilizer bars for rotary wing aircraft; to provide a tail surface for rotary wing aircraft as a speed-sensing element which responds to speed changes to change the effect of the tail surface with increased speed; to provide in helicopters a tail surface responsive to vertical accelerations to produce stabilizing forces on the fuselage proportional to the accelerations; to provide for helicopters a gyro bar stabilizer of low authority and long following time by which efficient stabilizing of the helicopter in all of its flight regimes is attained; to provide a gyroscopic bar assembly, for attachment to a helicopter which is unstable about its lateral and longitudinal axes, to effect positive dynamic stability about said axes; to provide for helicopters a gyro bar stabilizer of low authority and long following time without material effect on the pilot's control sensitivity and without material effect on maneuverability of the helicopter, while effecting positive dynamic stability about both the lateral and longitudinal axes of the helicopter; to provide a combined stabilizing system for a helicopter comprising a gyroscopic bar for the helicopter rotor and an independent bob weight tail control surface, so organized that the gyroscopic bar is set for good handling qualities during hovering, maintained during at least the inception of cruising, with the control surface functionally inert during hovering so that at cruising speeds the control surface imposes a stabilizing moment on the fuselage about the C.G. where the fuselage behaves as the moment arm and said moment is functional in magnitude with vertical accelerations and forward speed, complementing the stabilizer gyroscopic bar installation, to establish optimum stability and control and good handling qualities of the helicopter during all flight regimes; to provide in rotary wing aircraft a gyroscopic stabilizer bar or the like for the rotor having a long following time and by which the change of aircraft attitude and the rate of change of attitude are fed back into the rotor; to provide stabilizing means for rotary wing aircraft which is reliable, simple, fool-proof, low in cost, light in weight, is easy to maintain even in the field, which has minimal parasitic drag and minimal vibration; to provide a stabilizing system mounted on and above the helicopter rotor; to provide a stabilizing system which is readily adaptable to a helicopter in-being with minimum modification of the basic helicopter, while being effective throughout the flight range of such helicopter; to provide a stabilizing system for rotary wing aircraft which is acceptable to pilots of the aircraft as furnishing acceptable pilot control sensitivity without material effect on maneuverability; to provide a stabilizing system for rotary wing aircraft which not only senses disturbances on the aircraft but also generates power to effect substantial stabilization of the disturbances; and many other objects and advantages will become more apparent as the description proceeds.

In the accompanying drawings forming part of this description:

FIG. 1 represents a schematic diagram, in partially fragmentary form, illustrative of the gyroscopic bar mounting and its functional coupling with a rotor of a helicopter, according to the invention.

FIG. 2 represents an isometric elevation of the gyroscopic bar installation, in shaded portions, partially broken away for clarity, with the fragmentary rotor in unshaded portions, also broken away for clarity.

FIG. 2a represents a perspective view of the fragmentary portion of a weight arm as broken away from the center of the gyro bar shown in FIG. 2.

FIG. 2b represents a fragmentary perspective elevation of a rotor blade as separated from the right hand side of FIG. 2.

Figure 4:
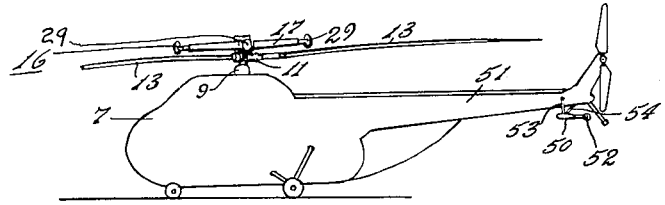
FIG. 4 represents a side elevation of an illustrative form of a helicopter to which the integrated stabilizing units of the instant invention have been applied.

The invention is preferably provided as a separately pre-fabricated, "retrofit," unit, or units, for attachment to and mounting on existing operational rotary wing aircraft, although of course, susceptible to design into and factory manufacture or installation at the time of construction of the rotary wing aircraft.

While the principles of the invention can be carried out in any single-rotor type of rotary wing aircraft, for illustrative purpose let it be assumed to be a helicopter of the class having a single rotor, regardless of the number of blades in the rotor, and of the order of approximately 7000# gross weight. In the illustrative case as indicated in the drawings a helicopter fuselage 7 mounts a mast 9, supporting a rotor hub 11 on which three blades 13 are mounted by means of knuckles 12, or the like. The rotor is driven in any desired manner, and illustratively by a power driven shaft rotatable in the mast 9 engaging a plate bolted to the rotor hub 11, to transmit torque thereto, (not shown but conventional). A pilot's control, (not shown but also conventional) is provided for effecting both selective cyclic and collective pitch control of the blades by a swash or star plate 10, or the like. The actual means for effecting blade pitch control is not material, as this can be effected in various ways, whether by adjusting servo tabs, or servo rotors, or the like, or by direct tilting of a blade about a longitudinal axis, or the like. All that is important in the invention is that there be provided a movable element associated with the rotor or with the blade or with linkage in or on the blade by which the pitch of a blade or blades is varied functionally with movement of such movable element, and that both the selective cyclic and collective pilot's pitch control through the swash plate have operative connection to such movable element. For purposes of illustration, let it be assumed that the pilot's control selectively effects both vertical adjustments and tilting of the swash or star plate 10, the outer member of which is rotatable with the mast 9, for collective pitch change and for cyclic pitch control respectively. For this purpose, connections extend between the swash plate arms 19 to pitch controlling arms 14 mounted on each blade respectively and illustratively and representing the movable element of a pitch changer, and in the illustrative case effecting pitch control by tilting the blade about its longitudinal axis. Prior to the addition of the gyro bar stabilizer to be described, the free end of each arm 14 is connected to a respective arm 19 by a push-pull rod (not shown, because removed and replaced by the push-pull rod 31 and adapter 30, to be described). As noted, the illustrative rotor has knuckles 12 for mounting the respective blades 13, and the blades 13 are disposed for flapping as is conventional.

It will be simpler to describe the gyro stabilizer bar as mounted on the rotor hub, even though such mounting may be accomplished, as noted, long after the instant helicopter has been operational without the gyro bar. For this purpose it will be understood that in general, illustratively, the helicopter rotor hub 11 has an upper access opening closed by a dust cover bolted to the hub. In many cases the dust cover mounts a hoisting eye.

The gyro stabilizing bar unit is mounted on a weldment 15' having a lower flange or mounting plate 15, which latter is arranged for bolted attachment to the rotor hub 11, in substitution of such dust cover, which, to reduce weight and use the same anchoring bolts or bolt holes, has been removed. The weldment 15' is generally annular and hollow, and has a vertical axis. The weldment has an upper flanged end containing and having driving relation to a splined shaft coupled to the inner member of a constant velocity universal joint 16a, the outer member of which mounts the hub 18 of the gyro stabilizer bar 16. The element 16a, although necessarily a constant velocity universal joint, would be difficult to indicate as such and for clarity and convenience has been illustrated as a gimbal suspension. The gyro hub 18 rigidly engages and supports weight arms 17, illustratively three in number if there are three blades 13 of the rotor. Weight arms 17 are disposed 120° apart and lie in a common gyroscopic plane. Each weight arm at its free end mounts a terminal weight 29. These may be of any desired configuration, but preferably each comprises a pair of "back-to-back" frustums of substantial cones, to minimize aerodynamic drag. A dust cover and seal 39 is provided on top of the gyro bar hub 18, to protect the constant velocity universal joint 16a, and to prevent slinging of lubricant.

Favorable results attach to the use of the constant velocity universal joint for the gyro bar that cannot be secured by a gimbal suspension. This is because deflections of the bar through as much as 20° cause large in-plane torsional variations. For efficient design with a bar sufficiently large as to provide effective stabilizing inputs, a constant velocity joint is dictated. In this connection, for purely illustrative purposes it may be noted that applicants presently prefer to utilize Rzeppa constant velocity universal joints, as disclosed for instance in catalogue No. 2, of The Gear Grinding Machine Company, of Detroit, copyright 1955, and as explained in a paper prepared by A. H. Rzeppa, as consultant to The Gear Grinding Machine Co. of Detroit, Mich. entitled "Universal Joint Drives," published by Machine Design, April 1953.

It will of course be understood that the gyro bar 16 is so organized with the constant velocity universal joint and the support that although the gyroscopic plane is fixed in space, and normally is perpendicular to the common axis of the weldment and rotor, the mast can assume various angular attitudes relative thereto in response to a disturbance, which effectively relatively tilts the plane to the mast axis. In passing it will be understood that the torque transmission to the gyro bar, illustratively, will be through the rotor drive shaft to a form of plate anchored in the rotor hub 11 below the cover plate, through coupling bolts into the mounting flange 15, through the weldment and its upper flange, and through the splined shaft into the inner member of the constant velocity universal joint, into the outer member thereof and into the gyroscopic bar 16.

In generally symmetrical spacing on the gyro bar hub 18, three damping trunnions 20, and three stabilizer input trunnions 21, or like pivotal connection points are provided. The symmetrical spacing may be of all of the trunnions if there is adequate space, as suggested in FIG. 1, otherwise the symmetry is between the damping trunnions, and between the stabilizer input trunnions, as respective groups. As shown in FIG. 2, the trunnions 20 and 21 are disposed in closely adjacent respective pairs between weight arms 17, so that the respective displacements of any pair with tilting of the gyro plane are substantially similar. Three dampers, illustratively and preferably of the viscous type, 22, each having a radially projecting arm 22', are mounted on weldment 15', as on flange 15 thereof or adjacent thereto and the free ends of the operating arms 22' are vertically in substantial alignment with the respective damping trunnions 20, and are connected thereto by pivoted links 23. It is presently preferred to use viscous dampers provided by Haines Gauge Company, now known as Sesco Manufacturing, Inc., of Bridgeport, Pa., as these are externally adjustable, fully temperature compensated and will develop torque sufficient for operation of the gyro stabilizer. Three brackets 24 are anchored to the weldment 15', as on mounting flange 15 thereof, and each pivotally supports a generally horizontal reversing lever 25, with the inner ends of each respectively in generally vertical alignment with the respective input trunnions 21, to which they are universally pivotally connected by links 26.

An adapter 30 is provided for bolted attachment to each arm 19 of the swash plate 10, where this may be necessary, as in most applications of the invention to helicopters already in-being, or else the swash plate itself is formed with arms on the swash plate predetermined for the purpose, in cases of application of the invention to helicopters during the construction of the latter. The adapter 30, or the swash plate arm 19 itself, is formed toward its outer free end to mount a cocked substantially horizontal pivot pin 30' or the like, for a mixing or combining lever 28 extending transversely of and beside the arm 19 of the swash plate or star plate 10. Pivot pin 30' is the point at which the pilot and stabilizer bar inputs are mixed, and preferably the lever 28 is asymmetrical of the pivot 30' as shown in FIG. 2.

The linkage is completed by a pivotally connected push-pull rod 27 connecting the outer free end of the reversing lever 25 with one free end of combining lever 28, and the push-pull rod 31 is pivotally connected to the other free end of the lever 28 and to the free end of the movable member 14.

It will be seen that relative tilt of the gyroscopic plane of the bar 16 in response to a disturbance of the helicopter, causes a given link 23 to move axially, and through the reversing lever movement and push-pull rod 27 to move the end of the combining lever 28. If at this moment the pilot holds his stick in mid position so that the swash plate is normal to the axis of the rotor, the movement of the end of lever 28 about the fulcrum 30', moves the other end of the lever and through the push-pull rod 31 effects a control movement of the movable pitch controlling element 14. In this case lever 28 functions as a lever of the first class. On the other hand if the bar is rotating in the gyro plane in its normal relative attitude of perpendicularity to the rotor axis, the linkage is stationary to the end of the combining lever 28, and the connection thereof to the push-pull link 27 forms a fulcrum for the combining lever, so that, if then the pilot tilts the swash plate, movement of the pivot pin 30' exerts a force on the lever moving same to move the push-pull rod 31 to place a control movement on the movable pitch controlling element 14 of the instant blade. In this case the lever 28 functions as a lever of the third class. In many cases there will be both stabilizer and pilot's control inputs, and the movement of the pitch control movable means will be as a resultant of both.

It will be seen that any relative tilt of the gyro plane effecting a pitch control input, also moves a link 23 relative to the instant damper 22, which both damps the motion of the control link controlling the input, and causes the gyro bar to gradually move relatively on its constant velocity universal joint to re-establish the gyro plane as normal to the axis of the rotor with the rate of re-establishment functional with the damping factor, to be explained. It will also be seen that with the combination recited, with the dampers functioning, the input from the bar to the blade is not proportional to attitude alone, it is also dependent upon the rate of change of attitude.

There are two important parameters to be considered in the successful design and operation of the gyro bar installation. One is the gyro bar control authority ($k_1$), which is the ratio of the change in rotor blade cyclic pitch to the relative deflection of the gyroscopic bar. This authority is determined by the linkage ratio of the train between the bar 16 and the blade pitch control 14. The other important parameter is the damping factor which is a function of damping coefficient, $C_d$. This factor defines the rate at which the gyro "follows" the rotor shaft, the so-called "following-time." This factor is controlled or established in the damper itself or by predetermined ratio of linkages between the bar and the damper.

The damping factor is expressed by the formula $$\frac{C_d}{2 \text{ (bar moment of inertia about its pivot point)}}$$

It is the factor by which the following-time is established, comprising the lag time for a given deviation between the mast and the gyro plane to reduce to $\frac{1}{10}$ of the deviation value, according to an exponential curve. The following-time phases the bar input to the control system with relation to the relative deviation of the gyro plane. The longer the following-time, the greater the lag. The lag incident to the proper following-time has the effect of changing a pure divergence into a mildly convergent long period oscillation.

An important consideration in the selection of the bar authority and the damping factor respectively lies in the highly sensitive area of pilot acceptability. What is quite acceptable for one pilot, is not wholly acceptable to another who is equally skilled. What comprises sensitivity of control and facile maneuverability of the helicopter by one pilot is not entirely acceptable on either count by another. It is therefore impossible, within the purview of the invention, to establish a fixed critical value, which is the same for all installations on helicopters, of either the bar authority or the damping factor.

These values vary, or are caused to vary in assembling the stabilizer with a helicopter, according to what functional effects the individual pilot concerned considers optimum for him. It is possible to establish a preferred range within which efficient results as an absolute value can be obtained, with a selection on the range of the specific factor effecting the results desired by a pilot. Thus, it is generally sufficient to provide a bar authority of between 5% and 20% which comes within the definition of "low authority," and to provide damping factors adequate to establish a range of following-time of between 3 and 12 seconds. Excellent results have been obtained with a bar authority of 15% for a given bar installation, with a damping factor of 0.29, effecting a following-time of 8 seconds.

In general, the stabilizer bar is an inertial device and is not affected by speed of translation in cruising, although the instability of the helicopter increases with speed, as noted. In hovering the aerodynamic helicopter derivatives are composed of the rotor derivatives only, since the fuselage and tail forces and moments are negligible, and the flight path may be considered to be parallel to the horizon. However, as noted, the instability of the helicopter increases with increase of forward speed. That is, the moment instability with angle of attack produced by the rotor is greatly increased with speed because control of the helicopter is accomplished through inclination of the primary lift vector relative to the fuselage. The gyro stabilizer bar tailored for hovering flight control frequently must compromise in cruising flight. While in many cases the gyro can effect adequate stabilizing functions throughout the flight range, according to the pilot's preferred settings, it still is a compromise at high speeds because of the slope of the stabilization gradient. While the slope may be gradual enough in certain cases as to retain stabilizing capabilities in high speed flight, in many cases this is not adequate, and safety in high speed flight may be jeopardized, and additional stabilizing means must be provided in conjunction with the gyro stabilizer if satisfactory handling qualities are to be obtained throughout all flight regimes. In further explanation of the point, recognizing that the instability of the helicopter increases significantly with forward speed, using a stabilizer the effect of which is independent of speed, if set for good handling qualities in hovering, would not be expected in the usual case to be completely effective in stabilizing the helicopter in high forward speed. Relatedly such a stabilizer set for good handling qualities in high speed flight would not be expected to provide good handling qualities in low speed flight and hovering.

What is required to supplement and combine with the gyro bar stabilizer set for good handling qualities in hovering, is an auxiliary stabilizer which is a sensing element for speed which provides stabilizing inputs functional with speed.

To effect optimum stabilization and good handling qualities and "hands off" flying in all flight regimes even under fairly turbulent conditions, it is sometimes necessary to combine the gyro bar, of now proven efficiency in hovering and low speed flight, with an auxiliary stabilization system, of now proven efficiency in varying speeds of forward flight, having the characteristics of a speed and acceleration sensing and responding device, the feedback of which is into the fuselage as stabilizing forces which afford stabilizing moments about the aircraft C.G. with the fuselage functional as a moment arm.

This invention provides a bob weight actuated tail stabilizer surface as the complement to the gyro stabilizer of the rotor. It is to be noted that just as, under certain circumstances, the gyro stabilizer bar can be used alone, without the bob weight stabilizer, so also under certain circumstances, the bob weight stabilizer can be used alone without a gyro bar stabilizer, but in general for optimum stabilization the unified system is preferred.

As will develop from the description of the bob weight tail, the latter comprises a mass unbalanced tail, flexibly mounted to the fuselage.

Figure 3:
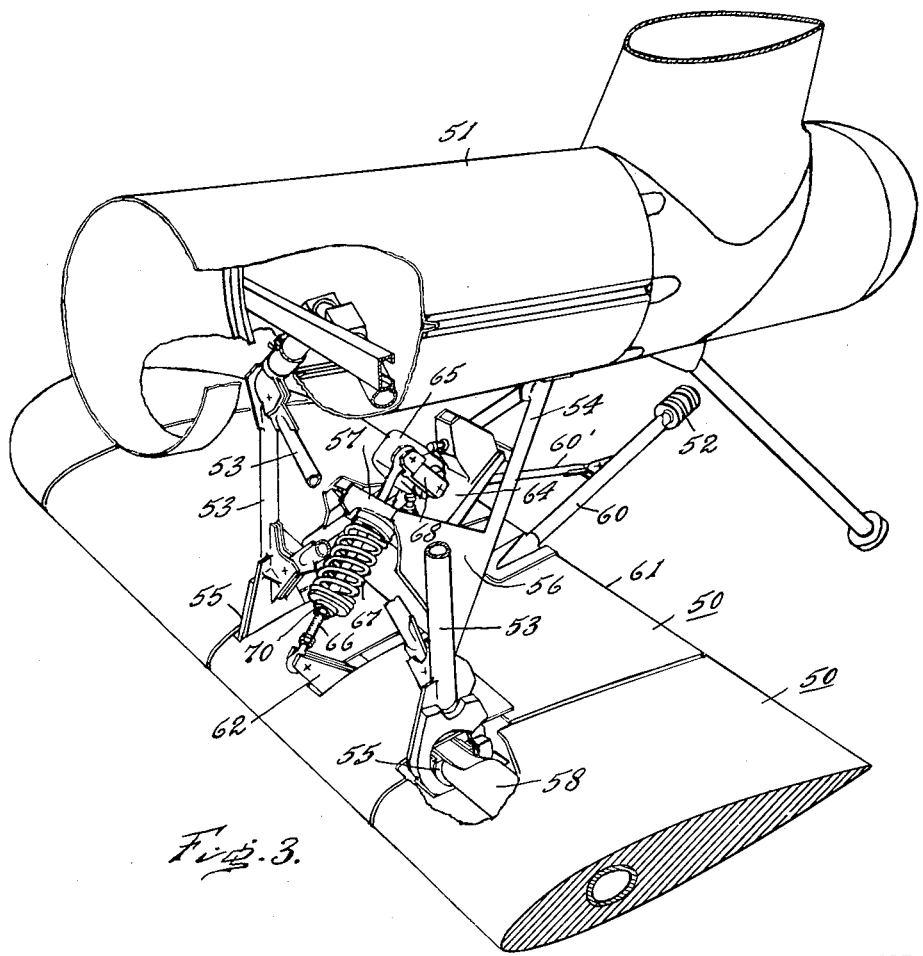
FIG. 3 represents a fragmentary isometric elevation of the tail surface and bob weight organization mounted on the tail cone of the fuselage of the illustrative helicopter.

Referring to FIG. 3, the tail stabilizer, complemental to the gyro stabilizer just described, comprises a more or less conventional horizontal tail surface, 50, that is flexibly mounted to the tail cone 51 of the helicopter, responsive in angular setting to an inertially responsive stabilizing bob weight 52.

The tail cone 51 of the fuselage supports a depending generally vertical forward truss structure 53—53, and a rearwardly sloping inverted V strut member 54, the legs of which anchor to the forward structure 53—53 in a pair of spaced spar bearings 55—55. The legs of the strut member 54 rigidly mount a bracket 56, including a forwardly and upwardly extending web 57. A spanwisely extending spar 58 is journalled in the bearings 55, and mounts the airfoil 50. The bob weight 52 is mounted on a bob weight arm 60 passing through the trailing edge 61 of the horizontal tail surface 50 to rigid anchorage on the spar 58. The bob weight arm is braced against lateral instability by a divergent brace element 60' between arm 60 and the airfoil 50. The spar 58 also rigidly mounts a splice fitting 62 extending through the upper surface of the stabilizing airfoil 50, and its outer free end moves in an arc with the spar bob weight and airfoil. A bracket extension 64 is rigidly anchored to the legs of the strut member 54 and to the bracket 56, and mounts a viscous damper 65. A rod 66 is pivotally connected to the outer free end of the splice fitting 62 and passes through a tension-compression restoring spring 67 and through an aperture in the web 57 to pivotal attachment to the free end of the arm 68 of damper 65. The mean angle of attack of the airfoil 50 is adjustable by a washer and nut assembly 70 adjustable along the rod 66.

The pitch axis of the tail surface 50 is located at the airfoil quarter chord, which coincides with the aerodynamic center of lift. Mass unbalance of the tail to create inertia forces is achieved by the use of the bob weight 52 which moves the tail surface C.G. aft of the pitch axis. Neutral position of the tail is established and maintained by use of the tension-compression restoring spring 67, which statically balances the tail assembly C.G. moments about the pitch axis. This neutral position is also the average angle of incidence required for trimmed normal straight and level flight. The damper 65 is incorporated in the system to provide critical damping for rapid decay of pitching oscillation, eliminating hunting and precluding resonant effects of main rotor vibrations.

It will be clear that when the instant helicopter experiences a vertical acceleration, the tail surface pitches proportional to the acceleration about the quarter chord, changing angle of attack and lift forces acting upon the fuselage. The resulting change in trim moment about the helicopter C.G. produces an opposite vertical acceleration, which restores the helicopter to its original trim flight attitude.

It may be noted that excellent bob weight stabilizing forces have been obtained where the tail has near critical damping and the natural frequency of the bob weight surface has been between the frequency of the helicopter phugoid and the rotor rotational frequency. These requirements are based on the desirability of elimination of the effects of rotor vibrations as well as the dynamic effects of the tail itself. Purely illustratively, excellent results have obtained with the tail surface complementing the gyro which has an authority ($k_1$) of the order of 0.1, and a gyro damping factor of between 0.2 and 0.6.

Reference may be made for additional data and description to WADC Technical Report 55–437, for any principles or details of the invention which may not have been completely expounded herein.

We claim as our invention:

1. A rotary wing aircraft having a driven lifting rotor including a blade and a movable element for varying the effective pitch of the blade, a pilot controlled swash plate, a combining lever pivoted to said swash plate, a connection from said lever to said movable element, a rotatably driven gyroscopic stabilizer device having a gyroscopic plane of rotation normally perpendicular to the axis of said rotor, means mounting said device for relative tilting of said plane in response to disturbances of the rotary wing aircraft, means for damping such tilt and urging said device toward return of said gyroscopic plane to its normal perpendicularity, and means for imposing a force input to said combining lever from said device functional in amplitude to the degree of tilt to actuate said movable element.

2. A rotary wing aircraft as in claim 1 in which means are provided to assure constant angular velocity of the gyroscopic stabilizing device, with respect to the torque input passing through said means, regardless of all disturbing influences.

3. A rotary wing aircraft as in claim 1 in which said movable element, swash plate, combining lever and means for imposing force comprise a linkage train of predetermined ratio establishing a device authority of between 5% and 20%, so as to establish stabilizer control inputs without material effect on the pilot's control.

4. A rotary wing aircraft as in claim 1 in which the means for damping has a damping coefficient by which following-time is established between the device and said rotor with the following-time selected from a range of between 3 and 12 seconds.

5. A rotary wing aircraft as in claim 1, in which the means for imposing a force input comprises a link pivoted to said device, a pivoted reversing lever is provided to one end of which said link is pivoted and a push pull rod is pivoted to the other end of said reversing lever and to said combining lever.

6. A rotary wing aircraft as in claim 1, in which said means for damping comprises a viscous damper having an actuating damper arm, connected by a link to said device.

7. A stabilizing attachment for a power driven lifting rotor of an aircraft having a hub, a plurality of blades on the hub, a swash plate, and movable means associated with the respective blades for varying the effective pitch of the respective blades, comprising as an article of manufacture a support for mounting on the top of such hub having an axis of rotation coincident with the axis of such rotor, a driven gyroscopic stabilizing means mounted on said support above such rotor and having a gyroscopic plane of rotation normally perpendicular to said axis of the support, a universal connection between said support and said stabilizer means whereby relatively said plane can tilt out of the perpendicular to said support in response to a displacement of said support, damper means between the stabilizing means and said support for urging said stabilizing means after such displacement toward a position in which said plane relatively assumes its normal perpendicularity to the axis of the support with a predetermined following time, a combining lever, means for pivoting said lever on such swash plate, means between the stabilizing means and said lever for impressing an input thereon functional in effect with the relative tilt of said stabilizing means and functional in its phase relation with the damping coefficient of said damper means, and a push-pull rod pivoted to said combining lever for attachment to such movable means for controlling the pitch of a blade.

8. A stabilizing attachment as in claim 7 in which said stabilizing means, combining lever, means between the stabilizing means and said lever, and said push-pull rod comprise a linkage train of predetermined ratio establishing a stabilizing means control authority between 5% and 20%, so as to establish stabilizer control inputs without material effect on the pilot's control.

9. A stabilizing attachment as in claim 7 in which the means for damping has a damping coefficient by which the following-time is established between the device and said rotor with the following-time selected from a range of between 3 and 12 seconds.

References Cited in the file of this patent

UNITED STATES PATENTS

| | | |
|---|---|---|
| 2,238,403 | Soderquist et al. | Apr. 15, 1941 |
| 2,384,516 | Young | Sept. 11, 1945 |
| 2,646,848 | Young | July 28, 1953 |
| 2,655,326 | Weick | Oct. 13, 1953 |
| 2,672,334 | Chenery | Mar. 16, 1954 |
| 2,677,429 | Laufer | May 4, 1954 |
| 2,689,099 | Lightfoot | Sept. 14, 1954 |
| 2,743,071 | Kelley | Apr. 24, 1956 |
| 2,743,889 | White | May 1, 1956 |
| 2,827,968 | Sissingh et al. | Mar. 25, 1958 |
| 2,941,792 | Stutz | June 21, 1960 |